US009019901B2

(12) United States Patent
Lee et al.

(10) Patent No.: US 9,019,901 B2
(45) Date of Patent: Apr. 28, 2015

(54) METHOD AND APPARATUS FOR TRANSMITTING AND RECEIVING PACKET DATA UNIT IN MOBILE COMMUNICATION SYSTEM

(75) Inventors: Jun-Sung Lee, Uiwang-si (KR); Hye-Jeong Kim, Suwon-si (KR); Do-Young Lee, Suwon-si (KR); Young-Taek Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1182 days.

(21) Appl. No.: 12/595,432

(22) PCT Filed: Apr. 11, 2008

(86) PCT No.: PCT/KR2008/002053
§ 371 (c)(1),
(2), (4) Date: Oct. 9, 2009

(87) PCT Pub. No.: WO2008/127034
PCT Pub. Date: Oct. 23, 2008

(65) Prior Publication Data
US 2010/0111016 A1    May 6, 2010

(30) Foreign Application Priority Data

Apr. 11, 2007 (KR) ........................ 10-2007-0035582

(51) Int. Cl.
*H04W 72/04* (2009.01)
*H04W 28/06* (2009.01)
(Continued)

(52) U.S. Cl.
CPC ............ *H04W 28/065* (2013.01); *H04W 28/06* (2013.01); *H04W 80/02* (2013.01); *H04L 1/0079* (2013.01); *H04L 1/1812* (2013.01)

(58) Field of Classification Search
USPC ................. 370/236, 329, 473, 474, 469, 470; 710/105
See application file for complete search history.

(56) References Cited

U.S. PATENT DOCUMENTS 7,079,542 B2 * 7/2006 Park et al. ................ 370/395.52
2002/0048281 A1 4/2002 Yi et al.
(Continued)

FOREIGN PATENT DOCUMENTS

EP    1720322 A1    11/2006
JP    10164131 A    6/1998
(Continued)

OTHER PUBLICATIONS

3rd Generation Partnership Project; Technical Specification Group Radio Access Network; Radio Link Controrl (RLC) protocol specification (release 6) 3GPP TS 25.322 V6. 3., Mar. 2005.
(Continued)

*Primary Examiner* — Donald Mills
*Assistant Examiner* — Henry Baron
(74) *Attorney, Agent, or Firm* — The Farrell Law Firm, P.C.

(57) ABSTRACT

The present invention relates to a mobile communication system, and in particular, to a method and apparatus for transmitting and receiving a PDU including an Extension Bit field and a Length Indicator field in a UE or a Node B. A method for transmitting a PDU generated with more than two SDUs and a header having information on each SDU in a transmitter of a mobile communication system is provided. The method includes generating, in the header, a Length Indicator (LI) indicating an end point of each of remaining SDUs except for the last SDU and an Extension Bit indicating the presence/absence of another LI after each LI, and generating the header so that the LI succeeds the Extension Bit associated therewith; generating the PDU with the generated header and the SDUs; and transmitting the PDU.

8 Claims, 8 Drawing Sheets

(51) Int. Cl.
  *H04W 80/02* (2009.01)
  *H04L 1/00* (2006.01)
  *H04L 1/18* (2006.01)

(56) References Cited

U.S. PATENT DOCUMENTS

| | | | | |
|---|---|---|---|---|
| 2002/0110095 | A1* | 8/2002 | Jiang et al. | 370/328 |
| 2002/0174276 | A1* | 11/2002 | Jiang | 710/105 |
| 2005/0213605 | A1 | 9/2005 | Kim et al. | |
| 2008/0025311 | A1* | 1/2008 | Okagawa | 370/392 |

FOREIGN PATENT DOCUMENTS

| | | |
|---|---|---|
| JP | 2002-125004 | 4/2002 |
| KR | 1020050095419 | 9/2005 |
| RU | 2 280 327 | 7/2006 |
| WO | WO 00/21253 A1 | 4/2000 |
| WO | WO 2004/042952 | 5/2004 |
| WO | WO 2005/122441 | 12/2005 |
| WO | WO 2007/023364 | 3/2007 |

OTHER PUBLICATIONS

LG Electronics Inc., "Discussion on RLC Length Indicator", R2-070725, 3GPP TSG-RAN WG2 #57, Feb. 12, 2007.

3rd Generation Partnership Project; Technical Specification Group Radio Access Network; Radio Link Control (RLC) Protocol Specification (Release 6), 3GPP TS 25.322 V6.9.0, Sep. 2006.

* cited by examiner

| D/C | Sequence number | | |
|---|---|---|---|
| Sequence number | | P | HE |
| Length indicator | | | 1 |
| Length indicator | | | 1 |
| Length indicator | | | 1 |

...

| Length indicator | 0 |
|---|---|

FIG.8A

| D/C | Sequence number | | |
|---|---|---|---|
| Sequence number | | P | HE |
| 0 | Length indicator | | |
| 0 | Length indicator | | |
| 0 | Length indicator | | |

...

| 1 | Length indicator |
|---|---|

FIG.8B

METHOD AND APPARATUS FOR TRANSMITTING AND RECEIVING PACKET DATA UNIT IN MOBILE COMMUNICATION SYSTEM

BACKGROUND OF THE INVENTION

1. Field of the Invention

The present invention relates generally to a mobile communication system, and in particular, to a method and apparatus for transmitting and receiving Packet Data Units (PDUs) in a User Equipment (UE) or a Node B.

2. Description of the Related Art

Currently, Long Term Evolution (LTE) standard is under discussion as the next generation mobile communication system succeeding the UMTS system. LTE is a technology for implementing communication for high-speed packet transmission at about 100 Mbps, aimed at deployment in around 2010. To this end, several schemes are now under discussion, and a typical one of the schemes moves a radio protocol function of a Radio Network Controller (RNC) to an e-Node B to maximally approximate it to radio channels.

FIG. 1 is a diagram illustrating an exemplary configuration of a next generation LTE mobile communication system.

Referring to FIG. 1, as illustrated, Evolved UMTS Radio Access Networks (E-UTRANs) 110 and 112 are simplified to a 2-node configuration of Evolved Node Bs (ENBs) (or Node Bs) 120, 122, 124, 126 and 128, and anchor nodes 130 and 132. A User Equipment (UE) 101 accesses an Internet Protocol (IP) network by means of the E-UTRANs 110 and 112.

The ENBs 120 to 128 correspond to the legacy Node Bs of the UMTS system, and are connected to the UE 101 over radio channels. Unlike the legacy Node Bs, the ENBs 120 to 128 perform more complex functions. In LTE, since all user traffics, including the real-time services such as Voice over IP (VoIP), are serviced over a shared channel, there is a need for an apparatus for gathering status information of UEs and performing scheduling using the information, and the ENBs 120 to 128 take charge of this function.

Like High Speed Downlink Packet Access (HSDPA) and/or High Speed Uplink Packet Access (HSUPA), LTE also has Hybrid Automatic Repeat reQuest (HARQ) performed between the ENBs 120 to 128 and the UE 101. However, since it is not possible to satisfy various Quality-of-Service (QoS) requirements only with HARQ, outer-ARQ can be performed in upper layers, and the outer-ARQ is also performed between the UE 101 and the ENBs 120 to 128.

To realize a data rate of a maximum of 100 Mbps, LTE is expected to use Orthogonal Frequency Division Multiplexing (OFDM) as a radio access technology in a 20-MHz bandwidth. In addition, Adaptive Modulation & Coding (AMC) that determines a modulation scheme and a channel coding rate depending on the channel status of UEs will be applied.

Many next generation mobile communication systems, including LTE, use both HARQ and ARQ as an error correction technique.

The term 'HARQ' as used herein refers to a technique for soft-combining previously received data with its retransmitted data without discarding the previously received data, thereby increasing a reception success rate. More specifically, an HARQ receiving side determines the presence/absence of an error in a received packet, and then sends an HARQ positive Acknowledgement (HARQ ACK) signal or an HARQ negative Acknowledgement (HARQ NACK) signal to a transmitting side according to the presence/absence of an error. Then the transmitting side carries out retransmission of the HARQ packet or transmission of a new HARQ packet according to the HARQ ACK/NACK signal. The HARQ receiving side soft-combines the retransmitted packet with the previously received packet to reduce an error occurrence rate.

The term 'ARQ' refers to a technique for checking sequence numbers of received packets, and issuing a retransmission request for a missing packet if any. This technique does not soft-combine the previously-received packet with its retransmitted packets. In the LTE system, the ARQ operation is managed by a Radio Link Control (RLC) protocol layer, and the HARQ operation is managed by a Media Access Control (MAC) or Physical (PHY) layer.

FIG. 2 is a diagram illustrating a protocol structure for an LTE system. In FIG. 2, layers of a transmitting side and a receiving side are shown in a symmetrical manner.

Referring to FIG. 2, an LTE system includes Packet Data Convergence Protocol (PDCP) entities 201 and 215, and RLC entities 203 and 213 per service. The PDCP entities 201 and 215 are in charge of an operation such as compression/decompression of an IP header. The RLC entity 203 reassembles RLC Service Data Units (SDUs) 217, or a packet output from the PDCP entity 201, in an RLC PDU 219 in an appropriate size, and the RLC entity 213 outputs RLC SDUs 227 to the PDCP entity 215 by combining an input RLC PDU 225, and performs an ARQ operation and the like.

MAC entities 205 and 211 are connected to several RLC entities 203 and 213 formed in one UE, and perform an operation of multiplexing the input RLC PDU 219 to a MAC PDU 221 and demultiplexing the RLC PDU 225 from a received MAC PDU 223.

Physical layers 207 and 209 make an OFDM symbol by channel-coding and modulating upper layer data and transmit the OFDM symbol over a radio channel; or demodulate and channel-decode OFDM symbols received over a radio channel and transfer the decoded OFDM symbols to an upper layer.

Undepicted HARQ entities possibly provided between the MAC layers 205 and 211 and the physical layers 207 and 209 exchange the MAC PDUs 221 and 223 with each other through a predetermined HARQ operation.

Generally, 'Layer 2 (L2)' refers to the PDCP, RLC and MAC layers 201 to 205 (211 to 215), and 'Layer 1 (L1)' refers to the physical layers 207 and 209.

The PDCP, RLC, MAC entities 201 to 205 (211 to 215) exist in pair for a transmitting side and a receiving side. For example, the transmitting-side RLC entity 203 and the receiving-side RLC entity 213 are associated with each other on a one-to-one basis.

FIG. 3 is a diagram illustrating a structure of RLC PDUs in a conventional mobile communication system.

Referring to FIG. 3, the transmitting-side RLC entity 203 transmits RLC PDUs 312 and 314 to the receiving-side RLC entity 213.

In structures of the conventional RLC PDUs 312 and 314, headers 311 and 313 include therein D/C field, Sequence Number field, P field, HE field, Length Indicator (LI) fields 321, 323 and 325, and Extension Bit fields 322, 324 and 326.

The LI fields 321, 323 and 325 are fields for generally indicating an end of each of RLC SDUs 301 to 304 included in the RLC PDUs 312 and 314, and the Extension Bit fields 322, 324 and 326 are fields for indicating whether the next succeeding field is an LI field or data (i.e., payload).

The D/C field is a field indicating whether the current transmission PDU is a data PDU or a control PDU, and Sequence Number indicates a transmission number according to a transmission order of PDUs. The P field is polling bits for a polling operation, and the HE field indicates whether the next transmission octet is a start of data or an LI field.

A description will now be made of structures of the RLC PDUs 312 and 314 in FIG. 3 when the RLC SDUs 301 and 302 are transmitted on one RLC PDU 312 and a part 327, which was cut out from the RLC SDU 302 without being transmitted in the previous transmission, is transmitted in the next RLC PDU 314 along with the RLC SDUs 303 and 304.

In FIG. 3, when several RLC SDUs 301 and 302 are included in one RLC PDU 312 or an RLC SDU 327, which was cut out without being transmitted in the previous transmission, is transmitted, the LI fields 321, 323 and 325 are each formed with 7 bits in the headers 311 and 313 in order to indicate the inclusion/partial-transmission, and the Extension Bit fields 322, 324 and 326 for indicating whether the next succeeding field is LI or data is added thereto.

Specifically, in FIG. 3, the LI field 321 included in the header 311 indicates an end point of the RLC SDU 301 in a payload of the RLC PDU 312, the LI field 323 included in the header 313 indicates an end point of the RLC SDU 302 in a payload of the RLC PDU 314, and the LI field 325 indicates an end point of the RLC SDU 303 in the payload of the RLC PDU 314.

Since the LI fields generally indicate end points of SDUs included in the payload of each PDU as stated above, when several SDUs are bound together in one PDU during transmission, the number of LI fields increases with the number of RLC SDUs included in the payload of the PDU.

The LI indicates an offset from a start point of the current transmission PDU up to an end point of an SDU which is transmitted together in the payload of the PDU. Therefore, the LI is not a simple indicator but expresses a substantial value, and the receiving-side RLC entity 213 separates each SDU from the PDU using the LI according to a math expression.

In the header of an RLC PDU, the LI and Extension Bit are formed together in one byte (i.e., octet), and the LI field is followed by the Extension Bit field.

When the transmitting-side RLC entity 203 transmits the RLC PDU generated as stated above, the receiving-side RLC entity 213 performs an operation of FIG. 4 to check the LI.

FIG. 4 is a flowchart illustrating an operation for checking the conventional Extension Bit and LI.

In step 401, the receiving-side RLC entity 213 extracts an octet including an LI field from a header of an RLC PDU received from the opposing RLC entity 203, and extracts Extension Bit by performing a masking work. The receiving-side RLC entity 213 checks in step 403 whether the extracted Extension Bit is '1'. If it is '1', the receiving-side RLC entity 213 proceeds to step 405, and if it is not '1', the receiving-side RLC entity 213 proceeds to step 407.

In step 405 where the extracted Extension Bit is '1', the receiving-side RLC entity 213 determines that an LI field and an Extension Bit field of another RLC SDU exist in the next octet, and then proceeds to step 409. However, in step 407 where the extracted Extension Bit is not '1', the receiving-side RLC entity 213 determines that data exists from the next octet, and then proceeds to step 409.

In step 409, since the extracted Extension Bit is present after the LI field, the receiving-side RLC entity 213 right-shifts the octet including the LI field by 1 bit before extracting the LI field, and checks LI included in the LI field in step 411.

To check an LI value included in an RLC PDU, the receiving-side RLC entity 213 of the conventional asynchronous system should perform masking for determining Extension Bit and then perform again a shift operation for LI after reading out a byte in which the LI is included. The shift operation should be performed for every octet including an LI field regardless of the contents of Extension Bit. Therefore, there is a demand for a scheme capable of efficiently checking LI in the receiving-side RLC entity 213.

SUMMARY OF THE INVENTION

Accordingly, an aspect of the present invention provides a method and apparatus for transmitting and receiving PDUs after setting an Extension Bit field and an LI field in a mobile communication system.

Another aspect of the present invention provides a method and apparatus for generating a header so that an LI field succeeds its associated Extension Bit field, and transmitting and receiving PDUs in a mobile communication system.

According to one aspect of the present invention, there is provided a method for transmitting a Packet Data Unit (PDU) generated with more than two Service Data Units (SDUs) and a header having information on each SDU in a transmitter of a mobile communication system. The method includes generating, in the header, a Length Indicator (LI) indicating an end point of each of remaining SDUs except for the last SDU and an Extension Bit indicating the presence/absence of another LI after each LI, and generating the header so that the LI succeeds the Extension Bit associated therewith; generating the PDU with the generated header and the SDUs; and transmitting the PDU.

According to another aspect of the present invention, there is provided a method for receiving a Packet Data Unit (PDU) having more than two Service Data Units (SDUs) in a receiver of a mobile communication system. The method includes receiving the PDU; and when values of an Extension Bit and a Length Indicator (LI) corresponding to each SDU included in the PDU are greater than or equal to a predetermined value, masking the Extension Bit and determining a length of an SDU corresponding to the LI.

According to further another aspect of the present invention, there is provided a method for receiving a Packet Data Unit (PDU) having more than two Service Data Units (SDUs) in a receiver of a mobile communication system. The method includes receiving the PDU; and when values of an Extension Bit and a Length Indicator (LI) corresponding to each SDU included in the PDU are less than a predetermined value, masking the Extension Bit and determining a length of an SDU corresponding to the LI.

According to yet another aspect of the present invention, there is provided an apparatus for transmitting a Packet Data Unit (PDU) generated with more than two Service Data Units (SDUs) and a header having information on each SDU in a mobile communication system. The apparatus includes a header generator for generating, in the header, a Length Indicator (LI) indicating an end point of each of remaining SDUs except for the last SDU and an Extension Bit indicating the presence/absence of another LI after each LI, and generating the header so that the LI succeeds the Extension Bit associated therewith; a PDU generator for generating the PDU with the generated header and the SDUs; and a transmission unit for transmitting the PDU.

According to still another aspect of the present invention, there is provided an apparatus for receiving a Packet Data Unit (PDU) having more than two Service Data Units (SDUs) in a mobile communication system. The apparatus includes a reception unit for receiving the PDU; and a PDU checking unit for, when values of an Extension Bit and a Length Indicator (LI) corresponding to each SDU included in the PDU are greater than or equal to a predetermined value, masking the Extension Bit and determining a length of an SDU corresponding to the LI.

According to still another aspect of the present invention, there is provided an apparatus for receiving a Packet Data Unit (PDU) having more than two Service Data Units (SDUs) in a mobile communication system. The apparatus includes a reception unit for receiving the PDU; and a PDU checking unit for, when values of an Extension Bit and a Length Indicator (LI) corresponding to each SDU included in the PDU are less than a predetermined value, masking the Extension Bit and determining a length of an SDU corresponding to the LI.

BRIEF DESCRIPTION OF THE DRAWINGS

The above and other aspects, features and advantages of the present invention will become more apparent from the following detailed description when taken in conjunction with the accompanying drawings in which:

FIG. 8A is a diagram illustrating a structure of an RLC PDU for the conventional case where several LI fields are transmitted on one RLC PDU; and FIG. 8B is a diagram illustrating a structure of an RLC PDU for the new case where several LI fields are transmitted on to one RLC PDU according to the first embodiment of the present invention.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

The concept of the present invention will be described first. The present invention introduces an efficient operation of a receiving side by consecutively positioning an LI field and an Extension Bit field in generating a header of a PDU in a mobile communication system.

A detailed description of the present invention will be given herein with reference to an RLC layer of a Wideband Code Division Multiple Access (WCDMA) system which is a UMTS-based OFDM communication system. However, it will be understood by those skilled in the art that the efficient position setting for Extension Bit, aimed by the present invention, can be applied even to other mobile communication systems supporting the similar technical background and channel format with a slight modification without departing from the spirit and scope of the invention.

Figure 5:
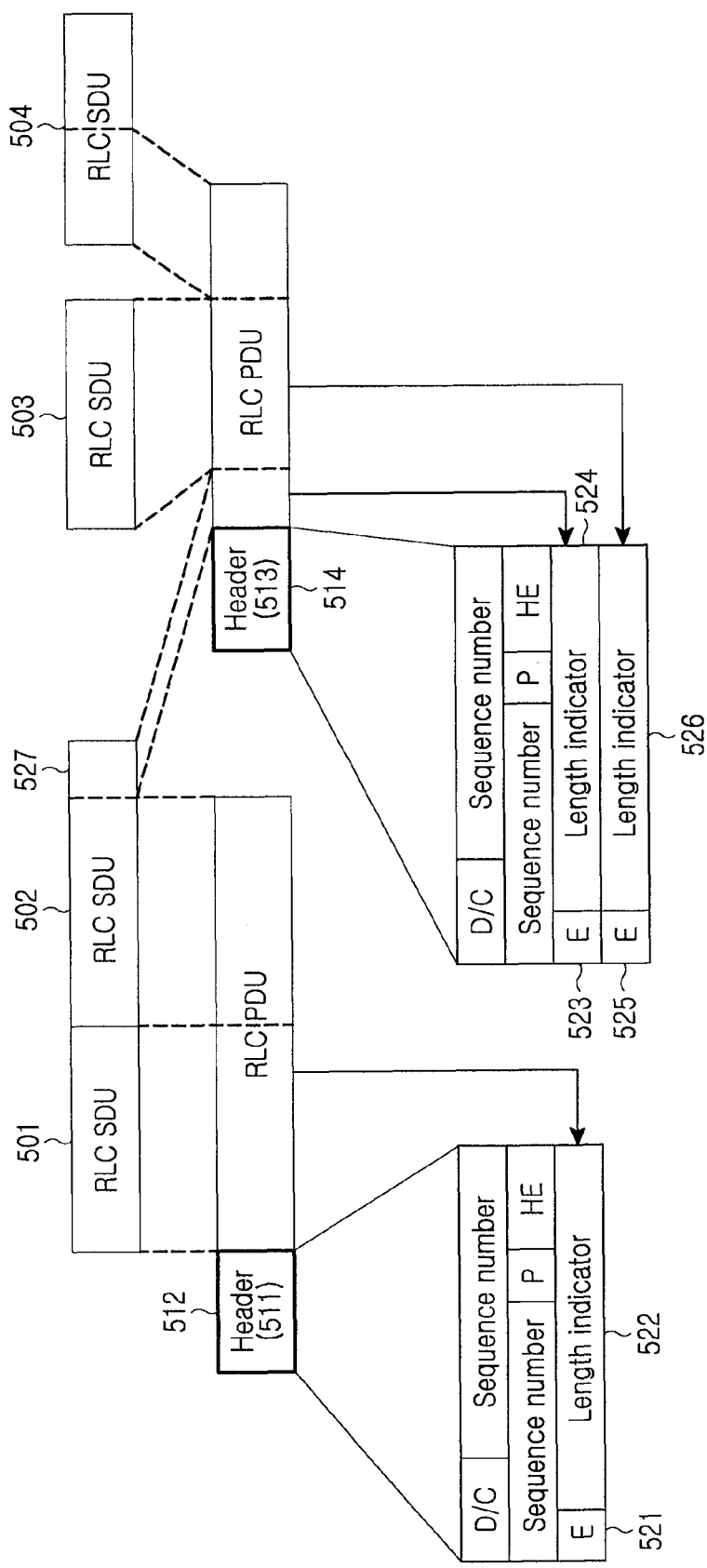
FIG. 5 is a diagram illustrating structures of RLC PDUs according to a first embodiment of the present invention.

FIG. 5 is a diagram illustrating structures of RLC PDUs according to an embodiment of the present invention.

A description will now be made of structures of RLC PDUs 512 and 514 in FIG. 5 when RLC SDUs 501 and 502 are transmitted on one RLC PDU 512 and a part 527, which was cut out from the RLC SDU 502 without being transmitted through the RLC PDU 512, is transmitted along with RLC SDUs 503 and 504 through the RLC PDU 514 which is the next transmission.

In the RLC PDUs 512 and 514, if several RLC SDUs 501 and 502 are included in one RLC PDU 512, or the part 527 which was cut out without being transmitted in the previous transmission is transmitted, Extension fields 521, 523 and 525 indicating whether their succeeding next fields are LI fields or data (i.e., payloads) are each formed with 1 bit in headers 511 and 513 to indicate the inclusion/partial-transmission, and LI fields 522, 524 and 526 each are formed with 7 bits after the Extension fields 521, 523 and 525.

Figure 1:
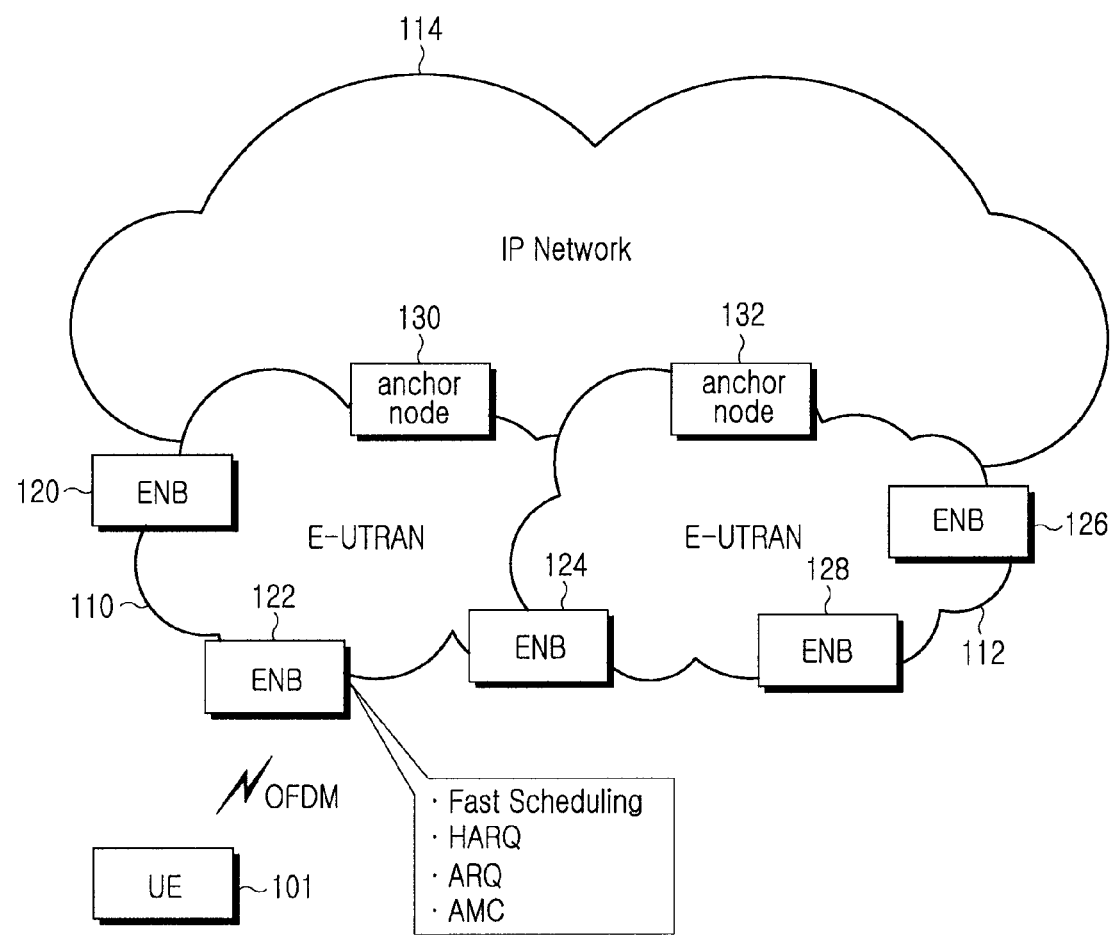
FIG. 1 is a diagram illustrating an exemplary configuration of a next generation 3GPP LTE mobile communication system.
Figure 2:
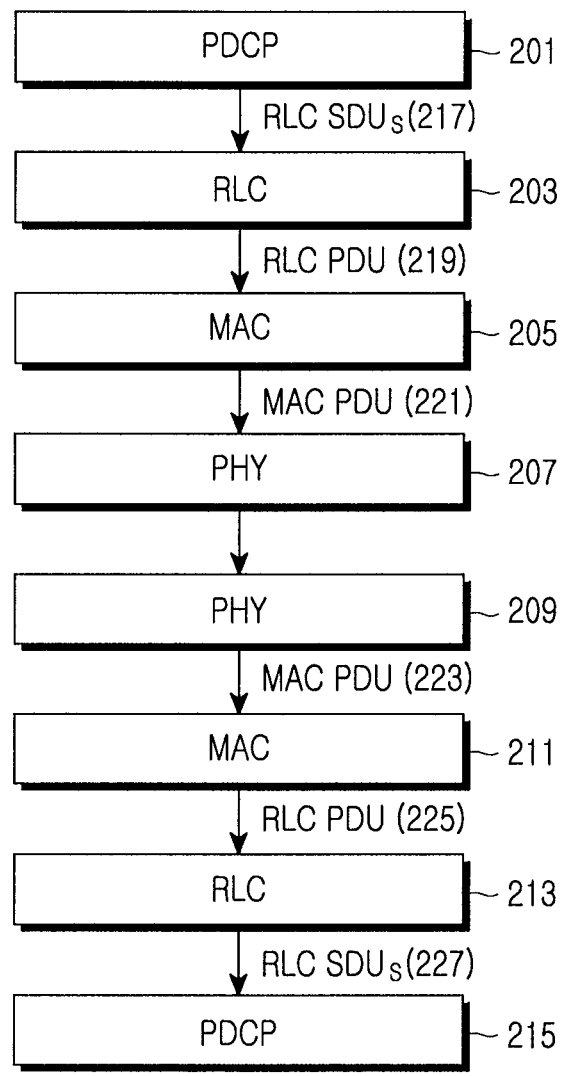
FIG. 2 is a diagram illustrating a protocol structure for a mobile communication system.
Figure 3:
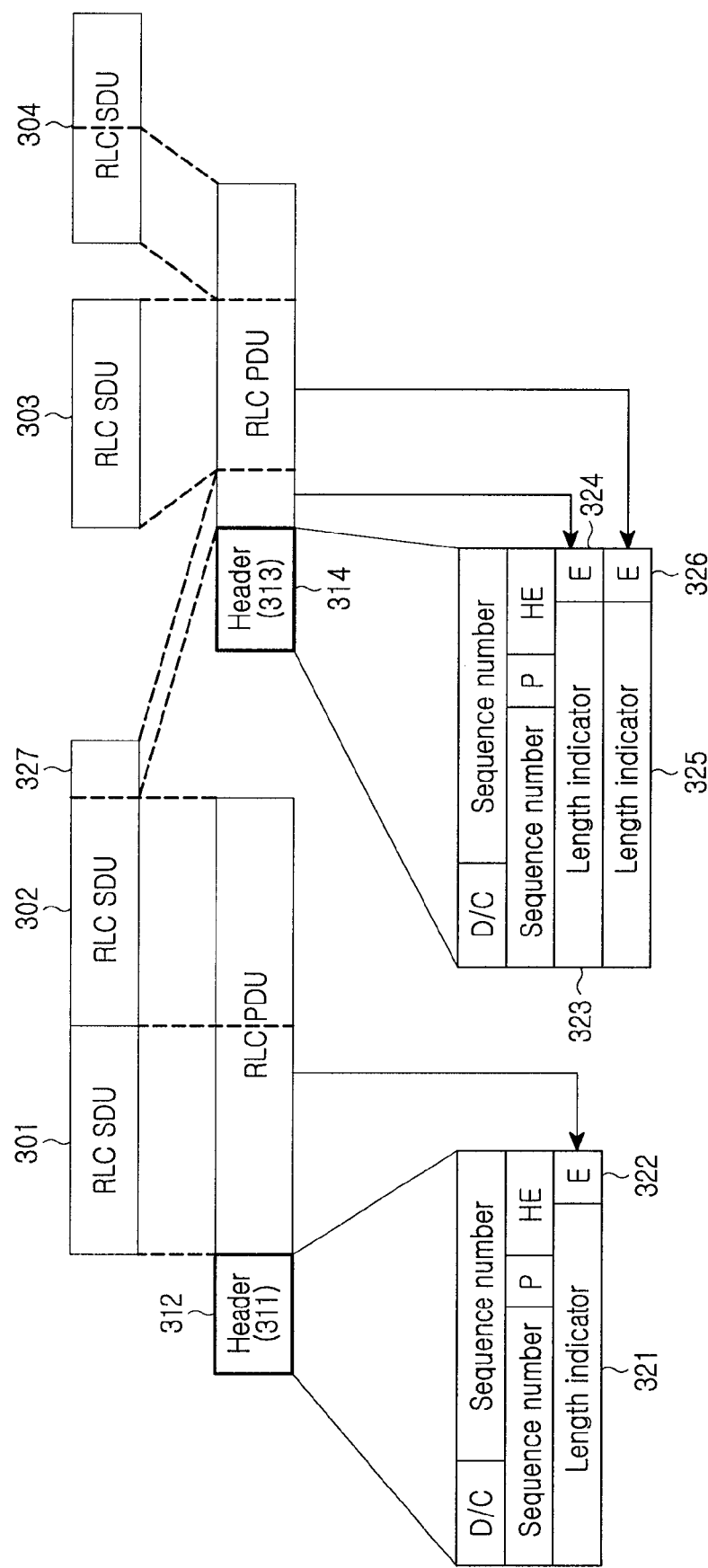
FIG. 3 is a diagram illustrating a structure of RLC PDUs in a conventional mobile communication system.

That is, from a comparison between the structure of the RLC PDUs in the conventional asynchronous mobile communication system described with reference to FIG. 3 and the structure of the RLC PDUs in the new asynchronous mobile communication system according to an embodiment of the present invention described with reference to FIG. 5, it can be understood that positions of the LI field and the Extension Bit field are exchanged.

Therefore, the transmitting-side RLC entity according to an embodiment of the present invention generates a PDU by inserting more than two SDUs in a payload of the PDU, and forms an LI field in a header of the PDU by generating a Length Indicator (LI) indicating an end point of each of the remaining SDUs except for the last SDU. The transmitting-side RLC entity forms the Extension Bit field by generating each Extension Bit in which an extension bit indicating the presence/absence of another LI field following each LI field is included. Further, the transmitting-side RLC entity generates the header so that each LI field succeeds its associated with the Extension Bit field, generates a PDU with the generated header and SDUs, and then transmits the generated PDU. Herein, an end point of the last SDU, since it is equal to an end point of the PDU, can be determined from all Length Indicators of the PDU delivered from the MAC layer in the same way as the conventional method.

With reference to Table 1 and Table 2, a description will now be made of an analysis on the meanings of Extension Bit in the structure of the RLC PDU according to different embodiments of the present invention, in which the analysis is made in a different way from the conventional one.

Table 1 shows meanings of Extension Bit in the structure of the RLC PDU according to a first embodiment of the present invention.

TABLE 1

| Extension Bit | Meaning |
| --- | --- |
| 0 | Data field |
| 1 | Another LI field |

In Table 1, Extension Bit=1 indicates that the next field is an LI field, and Extension Bit=0 indicates that the next field is data.

Table 2 shows meanings of Extension Bit in the structure of the RLC PDU according to a second embodiment of the present invention.

TABLE 2

| Extension Bit | Meaning |
|---|---|
| 0 | Another LI field |
| 1 | Data field |

As shown in Table 2, the meanings of Extension Bit in the structure of the RLC PDU according to an embodiment of the present invention can be set in the opposite manner from the meanings of the conventional Extension Bit. Since Extension Bit=0 indicates that the next field is another LI field as defined in Table 2, the receiving-side RLC entity can omit a masking operation for removal of Extension Bit.

Figure 6:
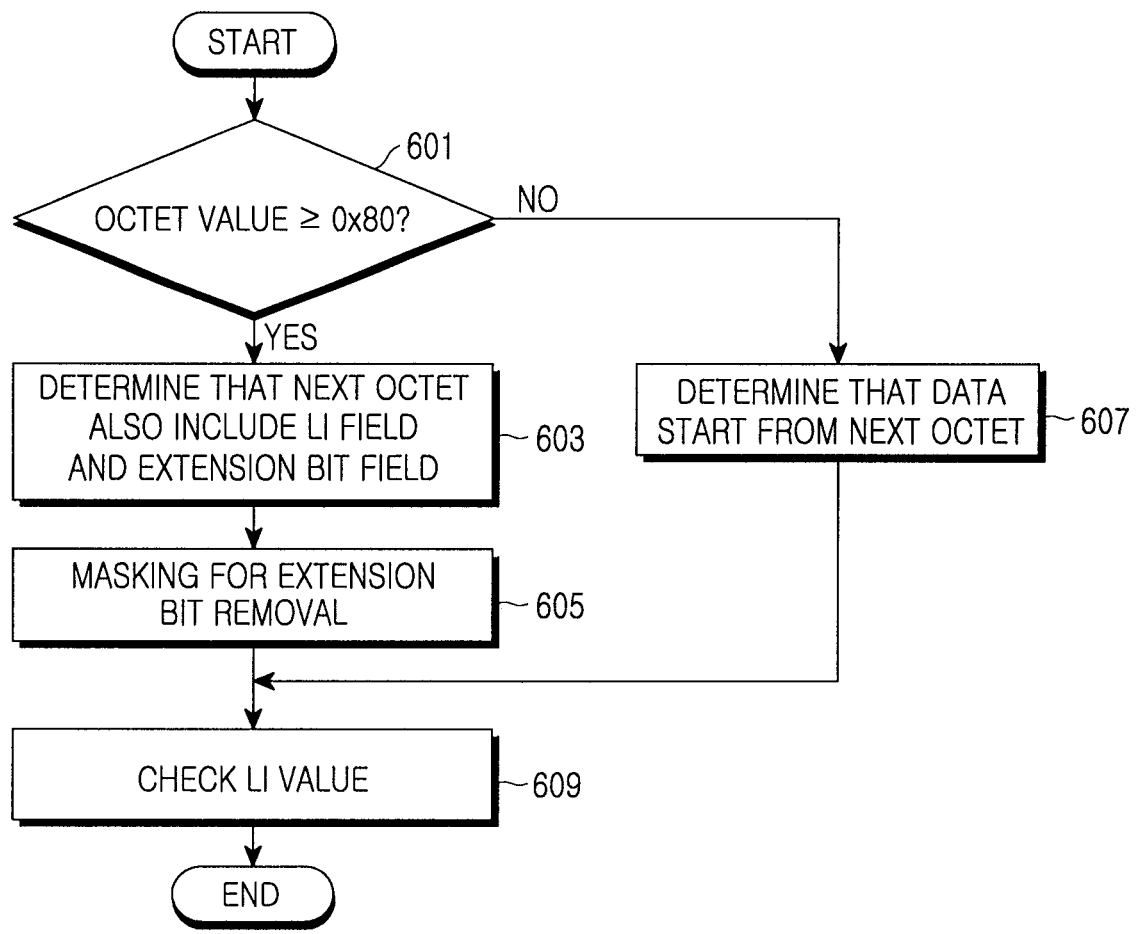
FIG. 6 is a flowchart illustrating an operation for receiving a structure of an RLC PDU and checking Extension Bit and LI according to the first embodiment of the present invention.

FIG. 6 is a flowchart illustrating an operation for receiving a structure of an RLC PDU and checking Extension Bit and LI according to the first embodiment of the present invention.

In FIG. 6, an LI field is used for distinguishing each RLC SDU bound in an RLC PDU during its transmission. LI is set with a series of numerical values indicating an offset from a start point of a payload included in the RLC PDU up to an end point of the RLC SDU, and Extension Bit indicates whether the next 1 byte is an LI field or a start point of the payload.

The structure of the RLC PDU according to the first embodiment of the present invention is provided by applying the Extension Bit to which the meanings of Extension Bit defined in Table 1 are applied, to the RLC PDU structure according to an embodiment of the present invention.

In step 601, the receiving-side RLC entity detects one octet including an LI field and an Extension Bit field from a header of an RLC PDU received from the opposing RLC entity, and determines whether a value of the octet exceeds a predetermined range (e.g., 0x80). If it is determined in step 601 that the value of one octet including an LI field and an Extension Bit field is greater than or equal to the predetermined range 0x80, the receiving side entity proceeds to step 603, and if the value is less than the predetermined range 0x80, the receiving side entity proceeds to step 607.

In step 603 where the octet value is greater than or equal to the predetermined range, the receiving-side RLC entity determines that an LI field and an Extension Bit field for another RLC SDU exist in the next octet. The receiving-side RLC entity removes Extension Bit by masking Most Significant Bit (MSB) of the octet in step 605, and checks LI included in the LI field remaining in the octet in step 609, to separate each SDU according to the LI.

However, in step 607 where the octet value is less than the predetermined range, the receiving-side RLC entity 213 determines that a payload (i.e., SDUs) exists from the next octet, and checks LI included in an LI field corresponding to the octet in step 609.

Here, if a value of one octet including the LI field and Extension Bit field exceeds 0x80, the receiving-side RLC entity 213 recognizes Extension Bit as '1', and if the value of one octet including the LI field and Extension Bit field does not exceed 0x80, the receiving-side RLC entity 213 recognizes Extension Bit as '0'. In this manner, the receiving-side RLC entity 213 can extract even Extension Bit. This is possible because a difference between 0 and 1 is definitely distinguished as Extension Bit comes at MSB.

Shown in FIG. 6 is an exemplary structure of the general UMTS RLC PDU in which an LI field is composed of 7 bits and an Extension Bit is composed of 1 bit. A comparison value (i.e., 0x80) used for calculating a value of Extension Bit is subject to change according to the number of bits in the LI field.

Figure 7:
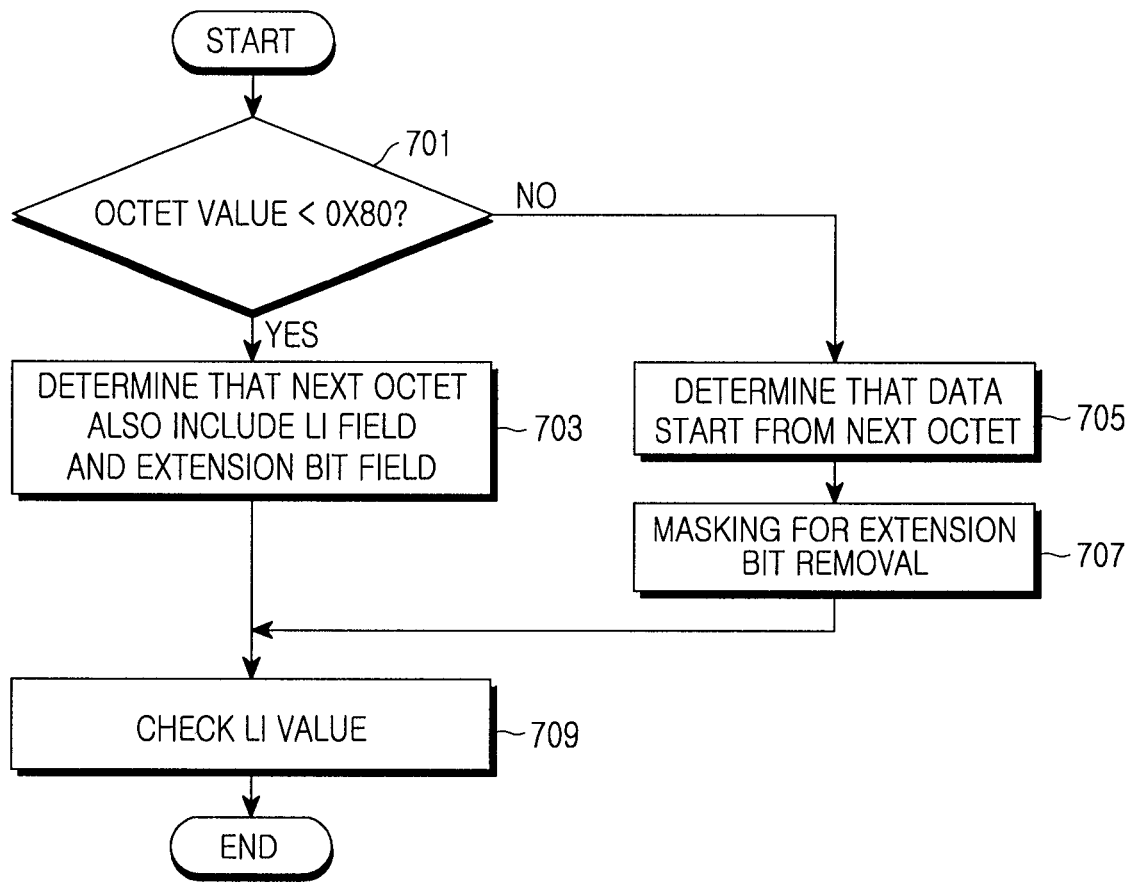
FIG. 7 is a flowchart illustrating an operation for receiving a structure of an RLC PDU and checking an Extension Bit and an LI according to a second embodiment of the present invention.

FIG. 7 is a flowchart illustrating an operation for receiving a structure of an RLC PDU and checking an Extension Bit and an LI according to the second embodiment of the present invention.

The structure of the RLC PDU according to the second embodiment of the present invention is provided by applying the Extension Bit to which the meanings of Extension Bit defined in Table 2 are applied, to the RLC PDU structure according to an embodiment of the present invention.

In step 701, the receiving-side RLC entity detects one octet including an LI field and an Extension Bit field from a header of an RLC PDU received from the opposing RLC entity, and determines whether a value of the octet exceeds a predetermined range, i.e., 0x80.

If it is determined in step 701 that the value of one octet including an LI field and an Extension Bit field is less than 0x80, the receiving side entity proceeds to step 703, and if the octet value is greater than or equal to 0x80, the receiving side entity proceeds to step 705.

In step 703, the receiving-side RLC entity determines that an LI field and an Extension Bit field of another RLC SDU exist in the next octet, and checks LI included in the LI field remaining in the octet in step 709, to separate each SDU according to the checked LI.

In step 705, the receiving-side RLC entity determines that a payload exists from the next octet. Thereafter, the receiving-side RLC entity removes Extension Bit by masking MSB of the octet in step 707, and checks LI included in the LI field remaining in the octet in step 709, to separate each SDU according to the checked LI.

Therefore, when the transmitting-side RLC entity transmits several LI fields on one RLC PDU using the RLC PDU structure according to the second embodiment of the present invention, the receiving-side RLC entity can check each Extension Bit and each LI by performing N comparisons, where N is the number of LI fields, and one masking, for a header of the RLC PDU.

A description will now be made of application of the RLC PDU structure according to first and second embodiments of the present invention in the next generation asynchronous system such as LTE. In LTE, LI and Extension Bit exist, and unlike in the conventional WCDMA asynchronous system, LI can be used as even a value indicating a length of each RLC SDU in the corresponding RLC PDU. Nevertheless, since LI in LTE also indicates a particular value, it is possible to apply the position of the Extension Bit field formed in one byte together with LI field in the RLC PDU structure during its transmission so that the Extension Bit field is situated in front of the LI field, according to an embodiment of the present invention described with reference to FIG. 5.

With reference to FIGS. 8A and 8B, a description will now be made of a comparison between the conventional case where several LI fields are applied to one RLC PDU and the new case where several LI fields are applied to one RLC PDU according to the first embodiment of the present invention.

FIG. 8A is a diagram illustrating a structure of an RLC PDU for the conventional case where several LI fields are applied to one RLC PDU, and FIG. 8B is a diagram illustrating a structure of an RLC PDU for the new case where several LI fields are applied to one RLC PDU according to the first embodiment of the present invention.

Figure 4:
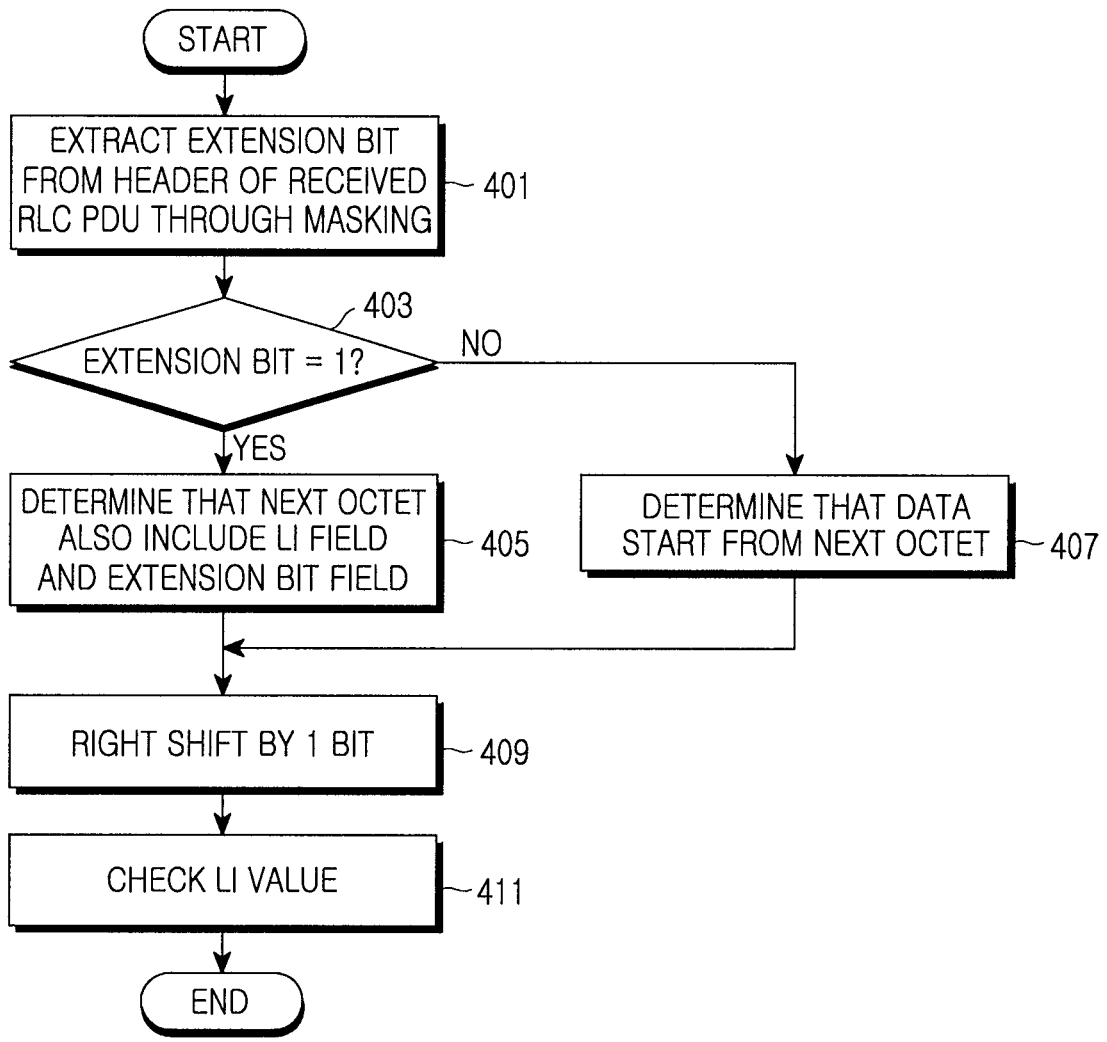
FIG. 4 is a flowchart illustrating an operation for checking Extension Bit and LI.

If the conventional scheme described in FIG. 4 is applied to N LI fields as shown in FIG. 8A, the receiving-side RLC entity performs N shifting, N comparisons, and N maskings.

However, if the first and second embodiments of the present invention are applied as shown in FIG. 8B, the receiving-side RLC entity performs only N comparisons and (N−1) maskings (for MSB removal).

As a result, if the transmitting-side RLC entity generates and transmits RLC PDUs in the RLC PDU structure based on the first and second embodiments of the present invention, the receiving-side RLC entity can perform an efficient operation compared with the conventional entity as N is greater.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a Packet Data Unit (PDU) in a transmitter of a mobile communication system, the method comprising:
    generating the PDU including a header and at least two Service Data Units Unite (SDUs); and
    transmitting the PDU,
    wherein the header includes at least one Length Indicator (LI) field and at least one Extension Bit field,
    wherein each LI field indicates a length of a corresponding SDU in the PDU,
    wherein each LI field is preceded by an Extension Bit field which indicates whether an SDU follows or another LI field follows, and
    wherein every SDU, except for a final SDU, in the PDU has a corresponding LI field and a corresponding Extension Bit field.

2. The method of claim 1, wherein each Extension Bit field is set to a first value if another LI field follows, and is set to a second value if an SDU follows, the first value beings different from the second value.

3. An apparatus for transmitting a Packet Data Unit (PDU) in a mobile communication system, the apparatus comprising:
    a PDU generator for generating the PDU including a header and at least two Service Data Units (SDUs); and
    a transmission unit for transmitting the PDU,
    wherein the header includes at least one Length Indicator (LI) field and at least one Extension Bit field,
    wherein each LI field indicates a length of a corresponding SDU in the PDU,
    wherein each LI field is preceded by an Extension Bit field which indicates whether an SDU follows or another LI field follows, and
    wherein every SDU, except for a final SDU, in the PDU has a corresponding LI field and a corresponding Extension Bit field.

4. The apparatus of claim 3, wherein the Extension Bit field is set to a first value if another LI field follows, and is set to a second value if an SDU follows the first value being different from the second value.

5. A method for receiving a Packet Data Unit (PDU) in a receiver of a mobile communication system, the method comprising:
    receiving the PDU including a header and at least two Service Data Units (SDUs); and
    processing the PDU,
    wherein the header includes at least one Length Indicator (LI) field and at least one Extension Bit field,
    wherein each LI field indicates a length of a corresponding SDU in the PDU,
    wherein each LI field is preceded by an Extension Bit field which indicates whether an SDU follows or another LI field follows, and
    wherein every SDU, except for a final SDU, in the PDU has a corresponding LI field and a corresponding Extension Bit field.

6. The method of claim 5, wherein each Extension Bit field is set to a first value if another LI field follows, and is set to a second value if an SDU follows, the first value is different from the second value.

7. An apparatus for receiving a Packet Data Unit (PDU) in a mobile communication system, the apparatus comprising:
    a reception unit for receiving the PDU including a header and at least two Service Data Units (SDUs)); and
    a processor for processing the PDU,
    wherein the header includes at least one Length Indicator (LI) field and at least one Extension Bit field,
    wherein each LI field indicates a length of a corresponding SDU in the PDU,
    wherein each LI field is preceded by an Extension Bit field which indicates whether one SDU follows or another LI field follows, and
    wherein every SDU, except for a final SDU, in the PDU has a corresponding LI field and a corresponding Extension Bit field.

8. The apparatus of claim 7, wherein each Extension Bit field is set to a first value if another LI field follows, and is set to a second value if an SDU follows, the first value being different from the second value.

* * * * *